United States Patent
Zhang et al.

(10) Patent No.: US 8,396,882 B2
(45) Date of Patent: Mar. 12, 2013

(54) SYSTEMS AND METHODS FOR GENERATING ISSUE LIBRARIES WITHIN A DOCUMENT CORPUS

(75) Inventors: Paul Zhang, Centerville, OH (US); Harry Silver, Shaker Heights, OH (US); David Steiner, Waynesville, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 172 days.

(21) Appl. No.: 12/869,456

(22) Filed: Aug. 26, 2010

(65) Prior Publication Data

US 2012/0054221 A1    Mar. 1, 2012

(51) Int. Cl.
*G06F 7/00* (2006.01)

(52) U.S. Cl. .................................. 707/758; 707/769

(58) Field of Classification Search .................. 707/758, 707/769
See application file for complete search history.

(56) References Cited

U.S. PATENT DOCUMENTS

| | | | |
|---|---|---|---|
| 6,038,574 A | 3/2000 | Pitkow et al. | |
| 6,182,066 B1 | 1/2001 | Marques | |
| 6,286,018 B1 | 9/2001 | Pitkow et al. | |
| 6,289,342 B1 | 9/2001 | Lawrence et al. | |
| 6,457,028 B1 | 9/2002 | Pitkow et al. | |
| 6,738,780 B2 | 5/2004 | Lawrence et al. | |
| 6,799,176 B1 | 9/2004 | Page | |
| 6,856,988 B1 | 2/2005 | Humphrey et al. | |
| 7,058,628 B1 | 6/2006 | Page | |
| 7,246,310 B1 | 7/2007 | Wolfe | |
| 7,302,638 B1 | 11/2007 | Wolfe | |
| 7,340,466 B2 | 3/2008 | Odom et al. | |
| 7,464,025 B2 | 12/2008 | Humphrey et al. | |
| 7,593,920 B2 | 9/2009 | Jackson et al. | |
| 7,620,626 B2 | 11/2009 | Jackson et al. | |
| 7,680,648 B2 | 3/2010 | Elbaz et al. | |
| 7,716,226 B2 | 5/2010 | Barney | |
| 2007/0130100 A1 | 6/2007 | Miller | |
| 2007/0239706 A1* | 10/2007 | Zhang et al. .................... | 707/5 |
| 2008/0071803 A1 | 3/2008 | Boucher | |
| 2009/0043797 A1* | 2/2009 | Dorie et al. .................. | 707/101 |
| 2010/0082634 A1 | 4/2010 | Leban | |
| 2010/0125601 A1 | 5/2010 | Jackson et al. | |
| 2010/0161611 A1 | 6/2010 | Guo et al. | |

OTHER PUBLICATIONS

Office Action Summary dated Jun. 20, 2012; original filing date Aug. 26, 2010; U.S. Appl. No. 12/869,413.
U.S. Appl. No. 12/869,413, filed Aug. 26, 2010, Notice of Allowance dated Nov. 9, 2012.

* cited by examiner

*Primary Examiner* — John E Breene
*Assistant Examiner* — Joshua Bullock
(74) *Attorney, Agent, or Firm* — Dinsmore & Shohl LLP

(57) ABSTRACT

A computer-implemented method of generating an issue library from a corpus of documents defining a citation network includes semantically linking, by a computing device, electronic documents within the corpus of documents by pairing reasons-for-citing in citing documents with cited-text-areas in cited documents and storing citation entries associated with the semantically-linked electronic documents in a citation-pairing metadata file. The method may further include searching the citation-pairing metadata file for reasons-for-citing and cited-text-areas that are semantically similar to at least one issue to thereby group similar documents and reasons-for-citing by issue, and storing information regarding groups of semantically-similar reasons-for-citing and cited-text-areas in a plurality of issue library metadata entities. Each issue library metadata entity is associated with an individual issue.

20 Claims, 11 Drawing Sheets

SYSTEMS AND METHODS FOR GENERATING ISSUE LIBRARIES WITHIN A DOCUMENT CORPUS

CROSS REFERENCE TO RELATED APPLICATIONS

This application is related to U.S. Patent Application Ser. No. 12/869,413 entitled "Methods for Semantics-Based Citation-Pairing Information," filed Aug. 26, 2010; U.S. Pat. No. 7,735,010 entitled "Citation Network Viewer and Method," filed Apr. 5, 2006; and U.S. Pat. No. 6,856,988 entitled "Automated System and Method for Generating Reasons That a Court Case is Cited," filed Dec. 21, 1999, but does not claim priority thereto, all of which are incorporated by reference in their entireties.

BACKGROUND

1. Field

The present specification generally relates to methods for identifying specific issues discussed within corpus of documents and, more particularly, to methods for extracting and organizing such issues identified in the document corpus into a structured issue library.

2. Technical Background

Documents within a corpus are often linked together by citations. For example, legal documents and scientific articles often cite to previous works to support a particular rule, proposition or finding. In the legal corpus context, an author of a judicial opinion often cites previous cases in support of his or her own legal statement or rule. In turn, these cited cases have themselves also cited and/or been cited by other cases in support of the proposition-in-question (and so on). Therefore, selected documents within the corpus are intrinsically linked together around particular issues, and these links can be manifested in the form of citation networks.

Researchers often search the corpus for documents that discuss a particular issue or topic. They will use the citations to move forward and backward within the corpus to find additional relevant documents. However, documents, such as legal documents, may discuss many different topics or legal issues. Further, a document may cite a document for many different reasons. Two citations pointing to the same document may cite to the same document for different reasons. Currently, the researcher does not know the particular issue or topic that a citing document is citing a cited document for based on the citation alone. The researcher must therefore sift through the many different cited documents.

Additionally, for any research project, a researcher may typically only be interested in documents pertaining to a certain issue or issues. The research process is therefore frequently impeded when a researcher is presented with documents that are unrelated to the immediate issue(s)-in-question. Further, a manual backwards and forwards citation-searching based on citation may be a very time consuming endeavor when researching these selected issues within the corpus, as well as a process that leaves many users uncertain about whether they have actually explored the full-range networked connections in sufficient depth.

Accordingly, a need exists for alternative methods of extracting an organizing issues within a corpus of documents into an issue library that may be accessed to enhance document searching capabilities.

SUMMARY

In one embodiment, a computer-implemented method of generating an issue library from a corpus of documents defining a citation network includes semantically linking documents within the corpus of documents, by pairing reasons-for-citing in citing documents with cited-text-areas in cited documents and storing citation entries associated with the semantically-linked documents in a citation-pairing metadata file. The method may further include searching the citation-pairing metadata file for reasons-for-citing and cited-text-areas that are semantically similar to at least one issue to thereby group similar documents and reasons-for-citing by issue. Information regarding groups of semantically-similar reasons-for-citing and cited-text-areas may be stored in a plurality of issue library metadata entities. Each issue library metadata entity may be associated with an individual issue.

In another embodiment, a computer-based issue library includes a plurality of electronic documents with a corpus and a plurality of electronic issue library metadata entities stored in a database separately from the plurality of documents. The documents within the corpus are linked by citations, thereby forming a citation network. Each issue library metadata entity is directed to an individual issue of a plurality of issues, and includes an issue identifier corresponding to the individual issue, issue text of the individual issue, possibly one or more taxonomy topics under which the individual issue identifier is located, and a plurality of issue instances. The individual issues of the issue library metadata entities may be organized by a taxonomy structure. The issue text is representative of the individual issue and is to be presented to an end-user researching the individual issue. Each issue instance comprises a reason-for-citing or a cited-text-area in a document, and each reason-for-citing or cited-text-area are semantically similar to one another and associated with the issue identifier.

In yet another embodiment, a computer-implemented system for generating an issue library from a corpus of documents, wherein documents within the corpus are linked by citations, thereby forming a citation network, includes: document linking means for semantically linking documents within the corpus of documents to pair reasons-for-citing in citing documents with cited-text-areas in cited documents and for storing citation entries associated with the semantically-linked documents in a citation-pairing metadata file, citation network searching means for searching the citation-pairing metadata file for reasons-for-citing and cited-text-areas that are semantically similar to at least one issue to thereby group similar documents and reasons-for-citing by issue, and data preparation means for storing information regarding groups of semantically-similar reasons-for-citing and cited-text-areas in a plurality of issue library metadata entities, wherein each issue library metadata entity is associated with an individual issue.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Embodiments described herein are directed to systems and methods for organizing issues discussed in a corpus of documents into an issue library. Embodiments utilize data-mining techniques to extract the issues from the corpus and store the issues in a repository, such as an issue library. The process by which issues are extracted, organized and stored is a data-driven and automatic process such that human intervention is minimal. In one embodiment, passages of individual documents are compared with other documents in the corpus to find semantically-similar passages. These passages are then linked in a one-to-one relationship and stored in a citation pairing metadata file. The citation pairing metadata is then traversed to extract grouped issues by chaining the same issue across all of the citation pairs. Information regarding the groups of issues may be stored in individual issue library entries. The issue library metadata entities may be configured as individual issue library metadata files, a single large xml file containing the issue library metadata entities, or entries stored in a database. End users, software applications/programs, and back-end processes may utilize the issue library metadata entities and the citation pairing metadata file to perform a wide variety of functions, such as searching the corpus for particular issues, assigning headnotes related to particular issues, generating finer taxonomy topics and issues, and presenting additional information related to issues of interest.

Further, embodiments aid in identifying networks of passages around particular issues, and then aggregating these issue-based networks into a library of issues which may be accessed in various ways to enhance document searching capabilities. Specifically, creation of such a library of issues may permit researchers to efficiently access pre-defined clusters of passages on pertinent topics with high levels of both precision and recall—an outcome that may limit the inconvenience of reading large numbers of irrelevant documents, while also eliminating much of the need for manually traversing individual links between documents in an effort to arrive a sense of research-completeness on an issue. Various embodiments of methods and systems of issue libraries for extracting, grouping and storing issues for a corpus of documents are described in greater detail herein.

Although the embodiments are described herein in the context of a corpus of legal documents, it should be understood that embodiments are not limited thereto. For example, the methods described herein may be utilized to create and store citation-pairing metadata for legal documents, scientific research documents, news articles, journals, and any other type of large corpus of documents where documents are linked by citations.

Figure 1:
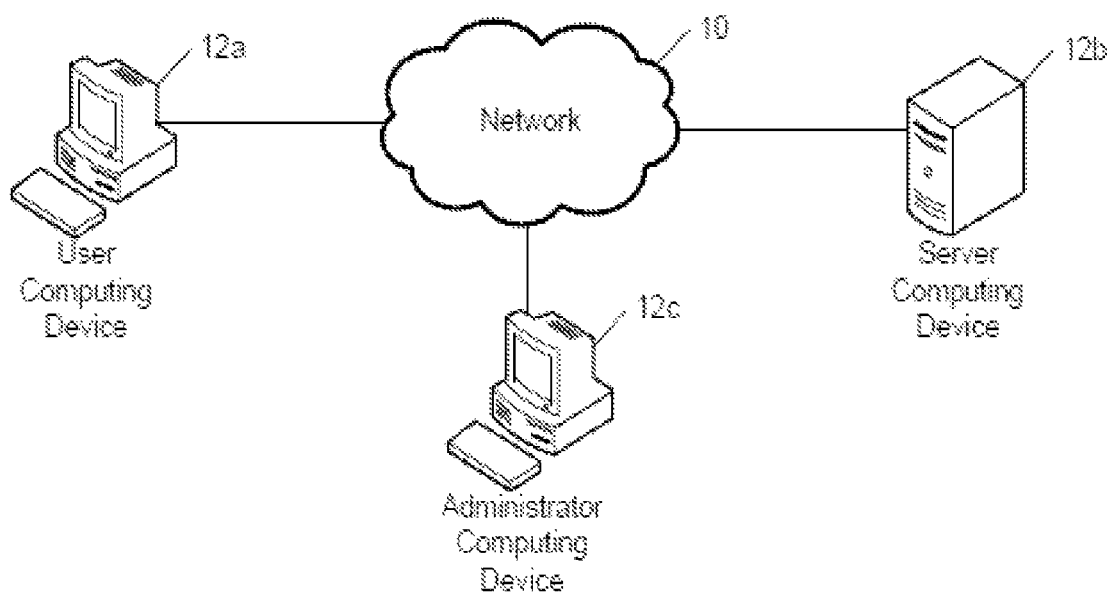
FIG. 1 depicts a schematic illustration of a computing network for a system for semantically pairing documents, according to embodiments shown and described herein.

Referring now to the drawings, FIG. 1 depicts an exemplary computing network, illustrating components for a system for generating issue libraries from documents within a corpus, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to input one or more documents into an electronic document corpus as well as initiate the creation of metadata, such as issue-library metadata. The user computing device 12c may also be utilized to perform other user functions. Additionally, included in FIG. 1 is the administrator computing device 12c. In the event that the server computing device 12b requires oversight, updating, or correction, the administrator computing device 12c may be configured to provide the desired oversight, updating, and/or correction.

It should be understood that while the user computing device 12a and the administrator computing device 12c are depicted as personal computers and the server computing device 12b is depicted as a server, these are nonlimiting examples. More specifically, in some embodiments any type of computing device (e.g. mobile computing device, personal computer, server, etc.) may be utilized for any of these components. Additionally, while each of these computing devices is illustrated in FIG. 1 as a single piece of hardware, this is also an merely example. More specifically, each of the user computing device 12a, server computing device 12b, and administrator computing device 12c may represent a plurality of computers, servers, databases, etc.

Figure 2:
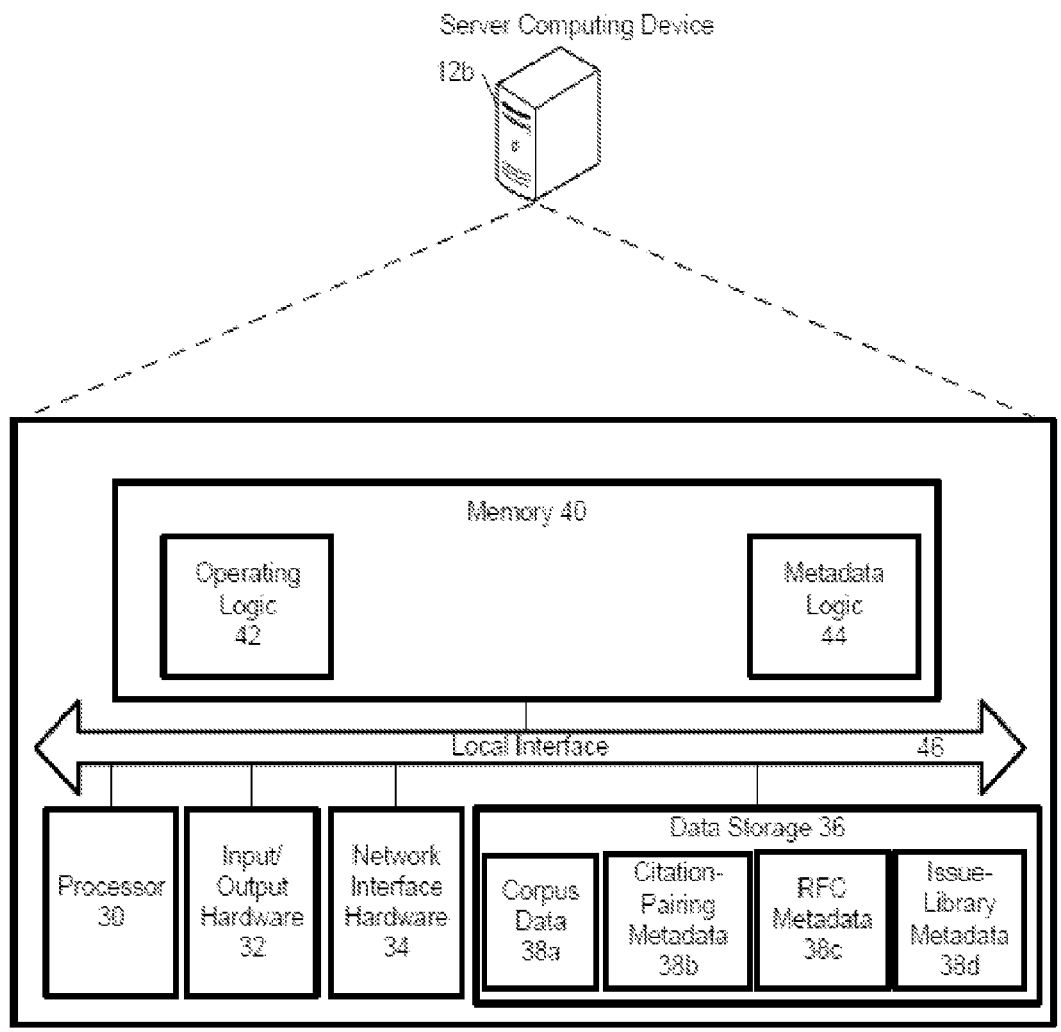
FIG. 2 depicts a schematic illustration of the server computing device from FIG. 1, further illustrating hardware and software that may be utilized in performing the semantics-based citation pairing functionality, according to embodiments shown and described herein.

FIG. 2 depicts the server computing device 12b, from FIG. 1, further illustrating a system for generating issue libraries and/or a non-transitory computer-readable medium for generating issue libraries embodied as hardware, software, and/or firmware, according to embodiments shown and described herein. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which stores corpus data 38a, citation-pairing metadata 38b, reasons-for-citing metadata 38c, and issue-library metadata 38d), and a memory component 40. The memory component 40 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42 and metadata logic 44 (each of which may be embodied as a computer program, firmware, or hardware, as an example). A local interface 46 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 stores corpus data 38a, which in at least one embodiment, includes legal and/or other documents that have been organized and indexed for searching. The legal documents may include case decisions, briefs, forms, treatises, etc. Similarly, citation-pairing metadata 38b generated by the metadata logic 44a may be stored by the data storage component 36 and may include information relating to the semantically linked documents. Reasons-for-citing metadata 38c may also be stored by the data storage component 36 and may include data related to the text excerpts corresponding citations present in documents of the corpus. Issue-library metadata 38d may also be stored by the data storage component 36 and may include data related to documents within the corpus that are organized by issue.

Included in the memory component 40 is the operating logic 42 and the metadata logic 44. The operating logic 42 may include an operating system and/or other software for managing components of the server computing device 12b. Similarly, the metadata logic 44 may reside in the memory component 40 and may be configured to facilitate electronic generation of the citation-pairing, reasons-for-citing and issue-library metadata as described in detail below. The metadata logic 44 may be configured to compile and/or organize metadata to enable additional user applications, such as electronic document search and retrieval as well as the organization of the documents within the corpus by issue.

It should be understood that the components illustrated in FIG. 2 are merely exemplary and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12b may include similar hardware, software, and/or firmware.

Figure 3A:
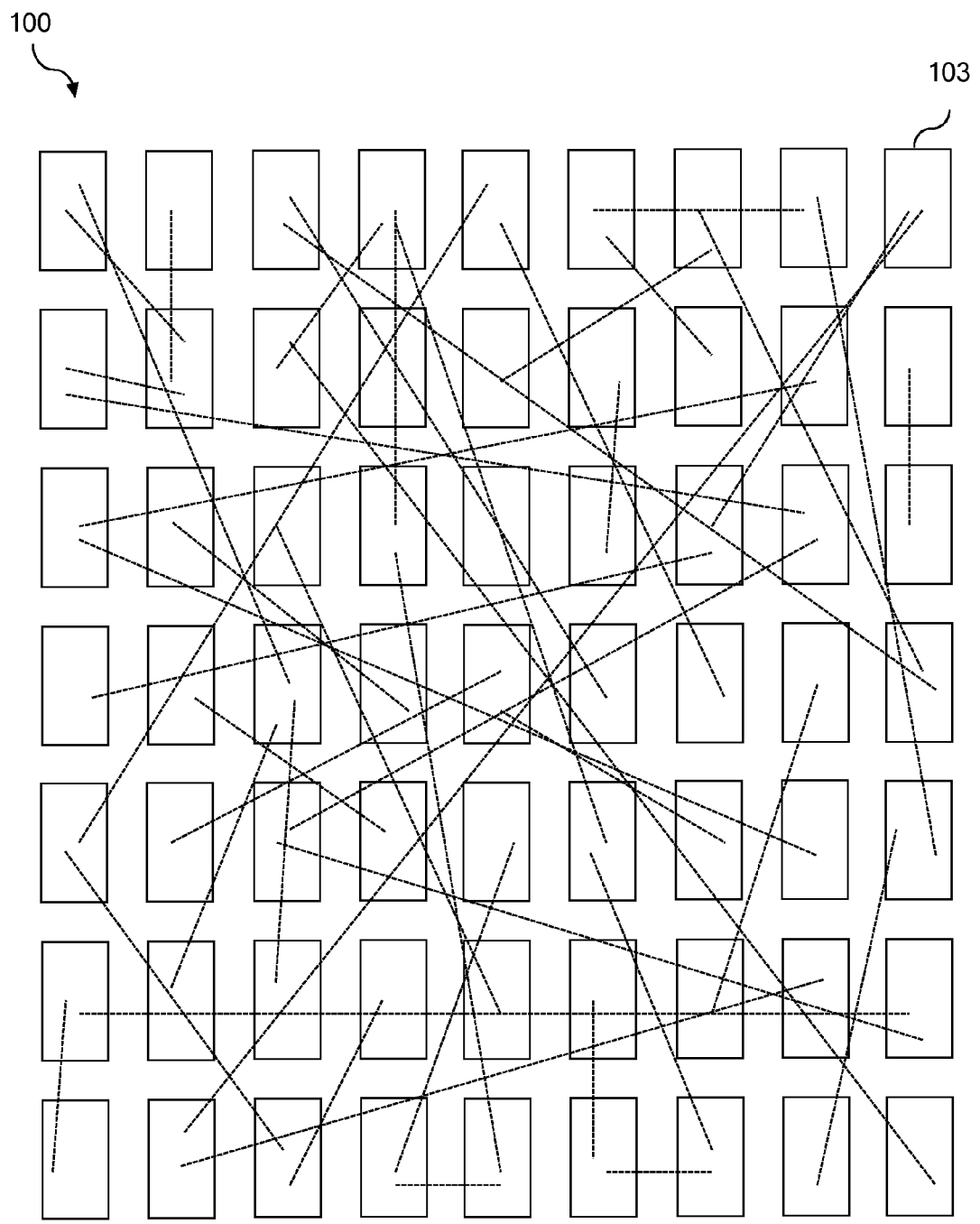
FIG. 3A depicts a schematic illustration of a document corpus according to one or more embodiments shown and described herein.

Referring initially to FIG. 3A, a corpus 100 of documents is illustrated. Within the corpus 100 are individual documents 103 that are linked via citations. For example, a citing document may include a citation that references a particular passage or text area of a cited document. The cited document may further cite other documents and so on. The citations and linked documents form a citation network within the corpus 100. It should be understood that the corpus 100 may include any number of documents 103.

The corpus 100 of documents may be a legal corpus comprising many individual judicial opinions. In some common-law countries, such as the United States, the legal system is based on stare decisis, wherein judges are obligated to follow the precedents established by prior judicial decisions. When preparing a judicial or legal opinion, the judge or person preparing the opinion must cite to documents to support particular rules, statements and facts. A citation is commonly located proximate to a reason-for-citing, i.e., the string of text that is located near the citation and suggests the reason for the particular citation to the cited document. Legal research is often performed by searching prior and subsequent cases of a legal issue based on citations located within each document. Therefore, knowing and understanding the reasoning why cases are linked together within the corpus 100 may be beneficial for efficient legal research.

Figure 3B:
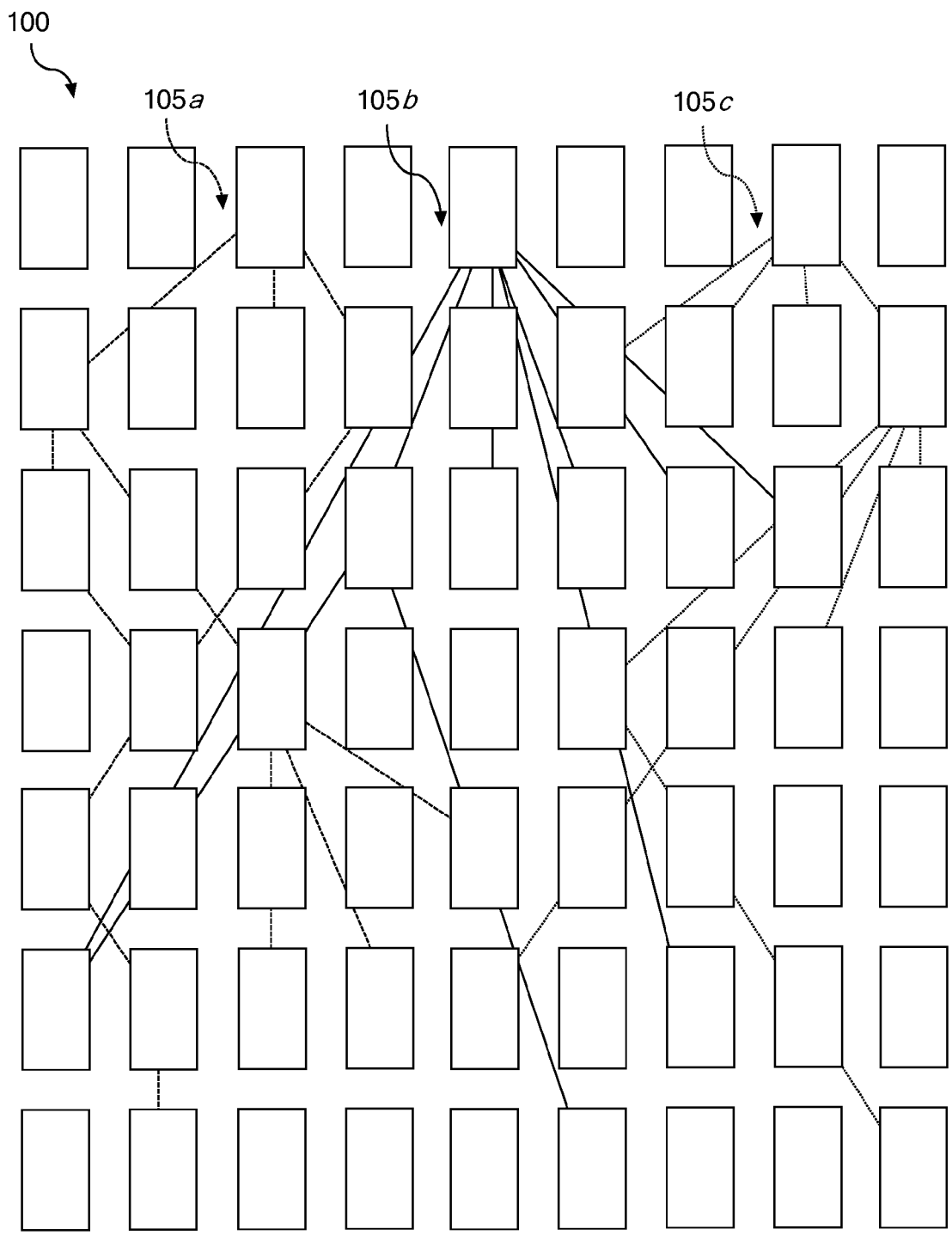
FIG. 3B depicts a schematic illustration of groups of documents having semantically-similar passages within a document corpus according to one or more embodiments shown and described herein.
Figure 3C:
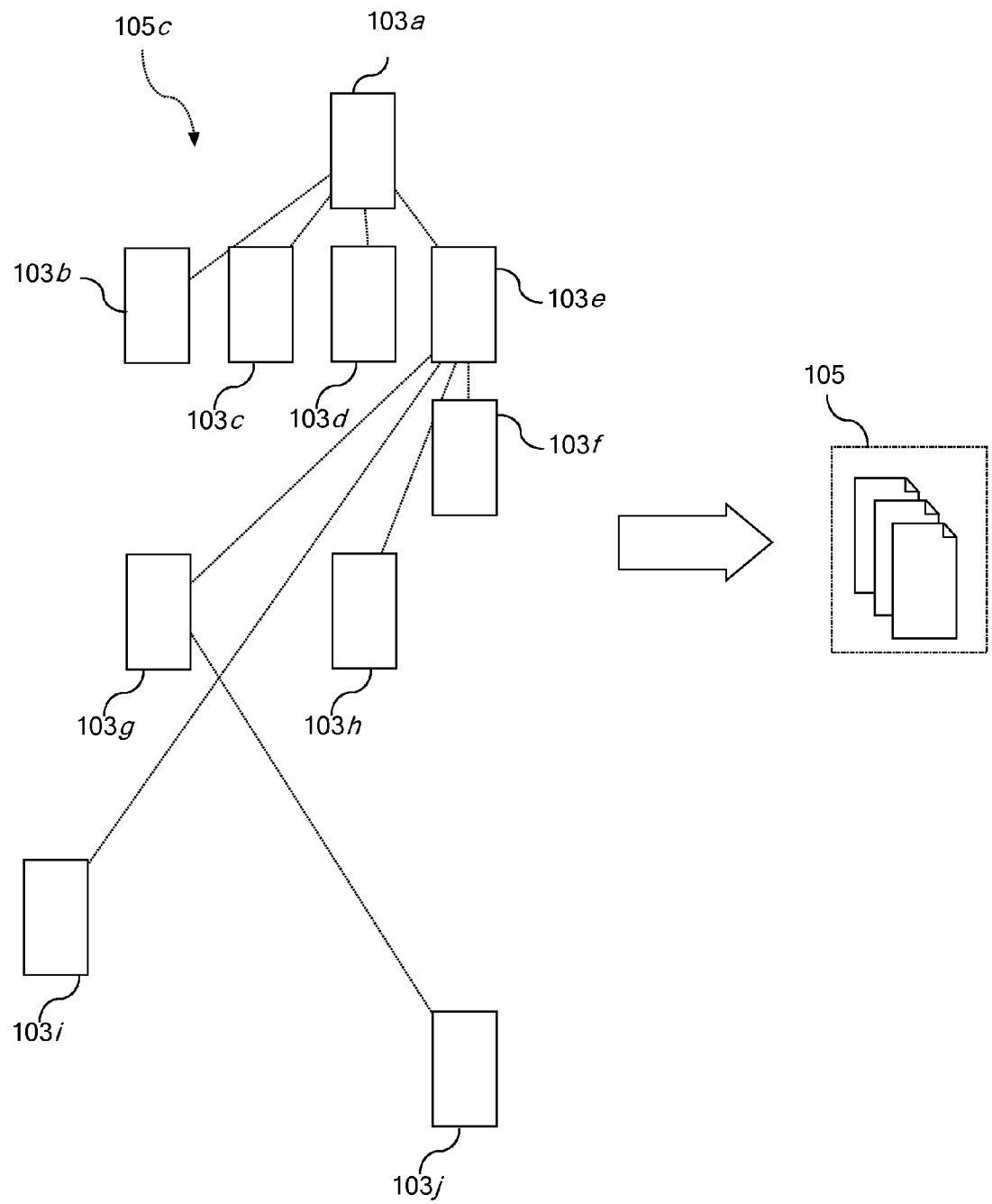
FIG. 3C depicts a schematic illustration of a group of documents associated with an issue and an issue library metadata entity according to one or more embodiments shown and described herein.

Referring now to FIGS. 3B and 3C, an example of a plurality of semantics-based sub-networks 105a-c that are each relevant to a particular issue or sub-issue exists within the corpus 100 is illustrated. FIG. 3C illustrates a plurality of documents (each numbered 103) that cite and/or are cited for a particular issue. The documents in sub-network 105a are related to one particular issue, the documents in sub-network 105b are related to another issue, and the documents in sub-network 105c are related to yet another issue. For example, the issue of sub-network 105b, which may be a legal issue in a legal corpus, may be related to the issue of when it is appropriate for new arguments to be introduced on appeal. There may be thousands of sub-networks related to a particular issue discussed within the corpus. As described in more detail below, data-mining and semantics-based traversing are used to discover these sub-networks and organize them into issues that form an issue library.

FIG. 3C illustrates a sub-network 105c that has been extracted from the corpus 100. The sub-network 105c is composed of a plurality of documents 103a-j that each have at least one passage that is semantically similar to a particular issue. Information regarding the extracted issue, the document citations, and semantically-similar passages are then written and stored into an electronic issue library metadata entity 105. The issue library is composed of issue library metadata entities that are generated from the corpus. In one embodiment, the issue library metadata entries may be configured as individual issue library metadata files. Alternatively, all of the issue library metadata entries may be stored together in a large xml file or a database.

The issue library metadata entity contains the issue-related information that may be utilized by software programs to perform various functions. As described in detail below, the issue library metadata entities may comprise an issue text statement that states the particular issue, citation information regarding the cases that discuss the issue, and issue instances of the discussion of the particular issue. The issue instances are the text passages within the documents that discuss the particular issue. The issue library metadata entities may be stored separately from the documents of the corpus.

As described above, the corpus may be data-mined to discover various issues that are discussed within the corpus. Use of the data-mining techniques described herein greatly enhances the ability to organize the corpus (which may consist of hundreds of thousands of documents) by various issues. Embodiments may be used to develop an issue library for an existing corpus as well as continuously and automatically add documents into the relevant issue library metadata entities as they are added to the corpus. For example, in a legal corpus, judicial opinion documents that are issued by a court may be analyzed as described herein and then respective passages may be added to the proper issue library metadata entities.

Figure 4:
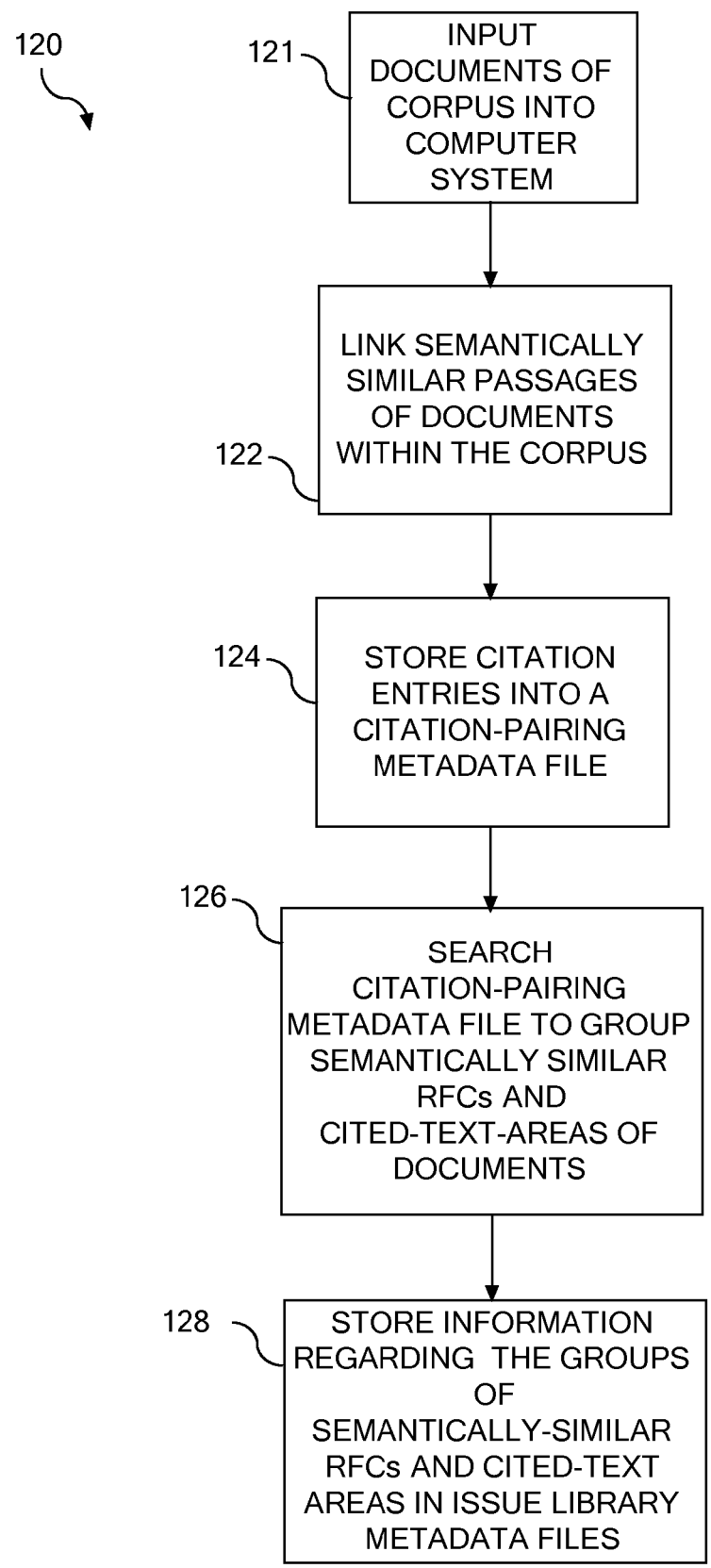
FIG. 4 depicts a flowchart illustration of a process for storing information regarding semantically-similar passages within documents into a plurality of issue library metadata entities.

FIG. 4 is a flowchart 120 that illustrates an exemplary data preparation process for extracting issues from the corpus and storing issue-related information into individual issue library metadata entities. At block 121, one or more documents of the corpus are entered into a computer system. At block 122, passages within individual documents are linked with semantically-similar passages of cited documents. Each document within the corpus may comprise one or more citations that link the citing document to one or more cited documents. A reason-for-citing is commonly present near the citation and suggests the particular reason for the citation. The reason-for-citing is often related to a particular issue of discussion. The citation within the citing document commonly refers to a reason-for-citing or a cited-text-area in a cited document.

A cited-text-area within a cited document may or may not have an associated citation. For example, a drafter of a judicial opinion may cite to a previous judicial opinion that is the originator of a particular rule the drafter wishes to incorporate into his or her judicial opinion. The rule in the previous judicial opinion most likely does not contain a citation. However, it is common for citing documents to cite previous reasons-for-citing in cited documents that have associated citations. Therefore, it is to be understood that a reason-for-citing is a passage of text that has an associated citation and a cited-text-area is a passage of text that does not have an associated citation. Reasons-for-citing and cited-text-areas in a cited document may be treated as equivalents according to the embodiments described herein.

As described in more detail below with respect to FIGS. 6-9, links are formed between passages of a citing document and the semantically-similar passages of the cited document(s) that it cites, thereby generating one-to-one relationships between the passages. In one embodiment, the passages that are linked semantically are the reasons-for-citing and cited-text-areas of the citing and cited document. For example, a link may be formed between a reason-for-citing of the citing document with the reason-for-citing or cited-text-area of a cited document that is most semantically similar to the reason-for-citing of the citing document. These semantic links may be generated as described below for each (or substantially each) reason-for-citing within the documents of the corpus.

At block 124, information regarding the links for the documents in the corpus are stored as individual citation entries in a citation-pairing metadata file. The citation-pairing metadata file contains one-to-one pairing information between a reason-for-citing of a citing document and a reason-for-citing/cited-text-area of a cited document. As an example and not a limitation, the citation-pairing metadata file may contain information such as a citing document identifier, a reason-for-citing, a cited document identifier, and a cited case reason-for-citing or cited-text-area. The citation-pairing metadata file may provide a single repository for the linked passages that may be easily accessed and utilized by various applications. Examples of citation-pairing metadata files and corresponding citation entries are described below with respect to FIG. 7.

The citation-pairing metadata file may be used to extract issues from the corpus. At block 126, the citation network of the corpus is traversed by searching the citation-pairing metadata file for passages that are semantically similar to one another. Semantically-similar passages that discuss the same issue are grouped together to form a sub-network of the citation network (e.g., sub-networks 105a-b illustrated in FIG. 3B). Text strings associated with the semantically-similar passages are retrieved based on their citation links. A depth-first search of the citation-pairing metadata file is performed to search all nodes (i.e., a discussion of an issue within a document) of the citation network that discuss the same or similar issue.

One exemplary method of traversing the citation network to determine documents having semantically-similar passages is described in U.S. Pat. No. 7,735,010, which is incorporated herein by reference as though fully set forth in its entirety. Generally, the exemplary method comprises performing a depth-first search of the semantic links in the citation-pairing metadata file based on either a user-specified issue represented by a reason-for-citing or a headnote, or an automatically-generated issue. A headnote is text that summarizes an issue found in a document and is expressed in the actual language used in the document. To extract entries for the issue library, an automatically-generated issue may be determined by systematically or randomly selecting a reason-for-citing in a citing or cited document and searching for passages in documents that are semantically similar to that selected reason-for-citing. At each node a list of new reasons-for-citing candidates or headnotes is returned, and each of theses new reasons-for-citing or headnotes is used to search for more candidates in a similar manner. The retrieved citations and corresponding semantically-similar passages are used to form the sub-network and are grouped together to be included under the corresponding metadata entries for the issue library.

Information regarding the groups of semantically-similar passages and documents may be stored in a plurality of issue library metadata entities at block 128. In one embodiment, each issue library metadata entity may be associated with one particular issue. Alternatively, multiple issues may be stored in a single issue library metadata entity. For example, groups of related issues may be stored in one issue library metadata entity. The process illustrated in FIG. 4 may be repeatedly executed to exhaustively mine the corpus to extract issues, group passages and documents by issue, and store such passages and documents in issue library metadata entities. The process may also be performed each time a new document is added to the corpus to extract the issues that the document discusses and place such issues in the appropriate issue library metadata entity.

The format and contents of the issue library metadata entities may be configured in a variety of formats. One example of a issue library metadata entity is provided below in Table 1 below. It should be understood that the exemplary issue library metadata entity below is for illustrative purposes only and that embodiments may have more or fewer entries, as well as different types of entries. Although the issue library metadata entities may be constructed in a table, a table is being used herein for ease of illustration and discussion and not as a limitation.

TABLE 1

| Metadata Field | Exemplary Metadata Field Entry |
| --- | --- |
| Issue Identifier: | I-000001 |
| Display Issue Text: | "It is well settled that rescission cannot be effected without an offer to restore, the only exception to this rule being where the vendee has received nothing of value. |
| Index Terms: | restore, rescission, . . . . . . |
| Taxonomy Topic: | "Rescission & Redhibition" |
| Issue Instance 1: | "He must give prompt notice of his election to rescind the contract, and he must restore or offer to restore everything of value which he has received thereunder." (*Taylor v. Hammel*, *39 Cal. App. 205*) |
| Issue Instance 2: | "Exceptions to the general rule that one seeking rescission in equity must as a condition precedent to action promptly rescind and restore or offer to restore what he has received are cases in which by reason of special circumstances it has on general equitable principles become unfair to impose such a condition of relief." (*Walsh v. Majors*, *4 Cal. 2d 384*) |
| Issue Instance 3: | ". . . there can be no rescission of an executed contract, upon the ground of fraudulent misrepresentation, without restoration before suit by the party seeking to rescind of everything of value which he had received from the other party under the contract, or a bona fide offer to restore." (*Kelley v. Owens*, *120 Cal. 502* |
| Issue Instance 4: | . . . . . . |

Referring to Table 1, the issue identifier field points to a particular issue that has been extracted from the corpus as described above. The issue identifier may be a unique code that corresponds to the particular issue. Each issue may be assigned a unique issue identifier. The issue identifier "I-000001" indicates an issue discussed within the corpus. It should be understood that embodiments described herein are not limited to the issue identifier format illustrated in Table 1. For example, the issue identifier may be a numeric code, an alphabetic code, or an alphanumeric code. Any number of formats may be utilized for the issue identifier.

The display issue text field contains a string of text that is associated with the particular issue of the issue identifier. In one embodiment, the display issue text string is an actual string of text from a document in the corpus that best represents the particular issue. The display issue text may be selected from all of the text strings (e.g., reasons-for-citing and cited-text-areas) of the documents that discuss the particular issue. These text strings are referred to as issue instances. As an example and not a limitation, one hundred cases may discuss a particular issue and be grouped together. The text strings that discuss the issue may be evaluated such that a single text string is selected from the one hundred issue instances in the group that best represents the particular issue. The selected text is designated as the display issue text and stored in the display issue text field of the issue library metadata entity. The display issue text may be the text that is presented to an end-user to provide a summary of the particular issue, for example. The display issue text may be selected automatically based on linguistic and other rules. For example, the issue instances may be evaluated and scored based on the number of key terms within the text string, the length of the text string, the date of document, etc. The display issue text may be selected in other manners as well, such as manually by a person.

The index terms field contains key terms that are relevant to the particular issue. The index terms may be generated automatically by comparing the text strings of the issue instances with a list of key terms and extracting those terms that are frequently contained in the text strings. The index terms may also be entered manually by a person who evaluates the issues and determines which terms are to be used as the index terms.

Figure 5:
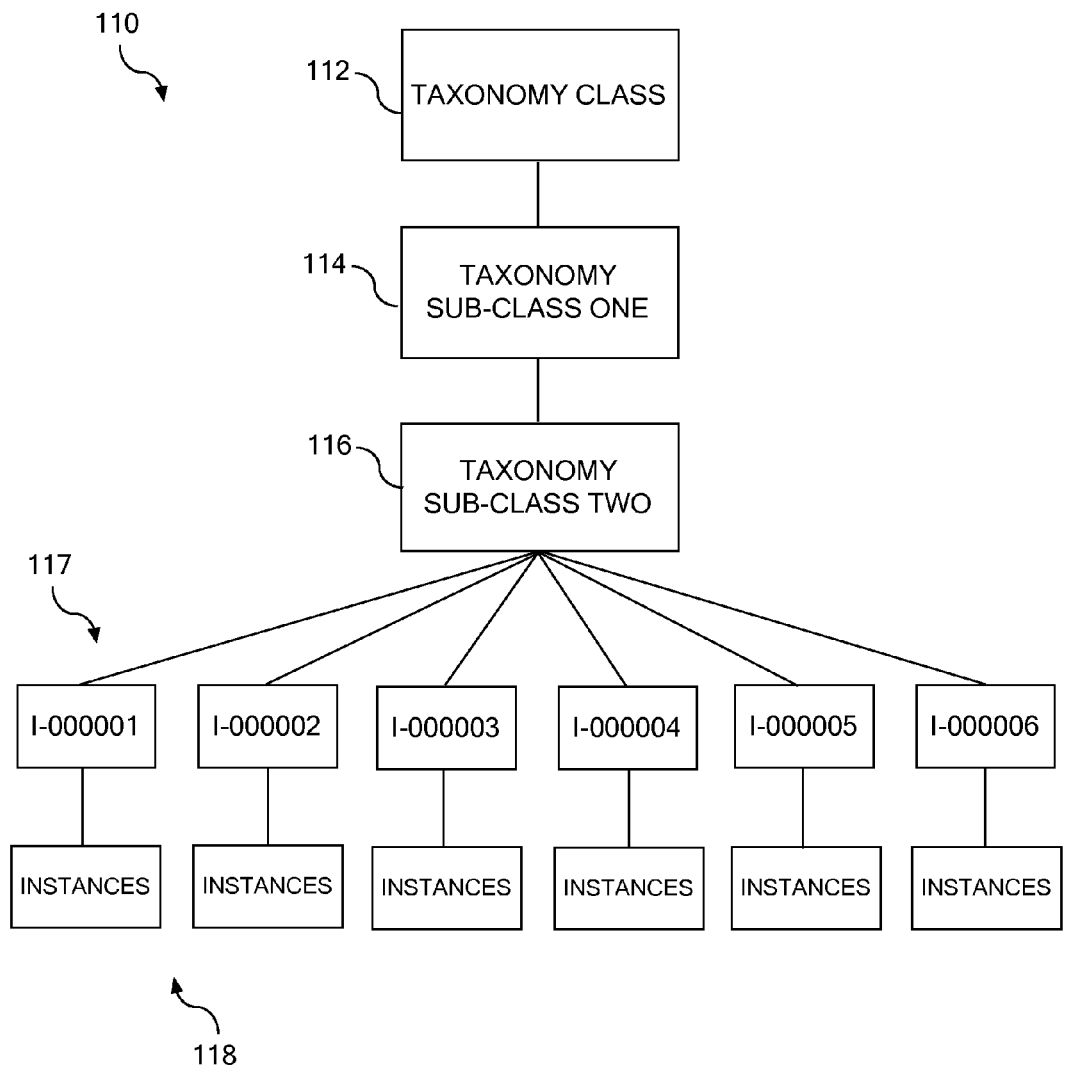
FIG. 5 depicts a schematic illustration of a taxonomy structure of a plurality of issues within the document corpus according to one or more embodiments shown and described herein.

The particular issues of the corpus may be placed within a taxonomy structure that organizes the corpus. The taxonomy specifies hierarchically-structured topics. The taxonomy may be organized by a tree of taxonomy topics. Each topic in the taxonomy may be seen as a place to host one or more issues. FIG. 5 illustrates a taxonomy structure that comprises three topics: taxonomy topic 112, taxonomy sub-topic one 114, and taxonomy sub-topic two 116. It should be understood that more or fewer taxonomy topics may be utilized depending on the concepts discussed in the corpus. As an example and limitation, taxonomy topic 112 may be titled "Contracts," taxonomy sub-topic one may be titled "Remedies," and taxonomy sub-topic two may be titled "Redhibition" in a legal corpus. It should be understood that any other taxonomy topics and sub-topics may be present within the taxonomy structure.

The issue instance fields contain information relating to the instances where the particular issue is discussed in the documents. The issue instances are text strings of reasons-for-citing and/or cited-text-areas that are related to the particular issue. In one embodiment, as depicted in Table 1, the issue instance fields may be populated with the actual text of the issue instance in the documents. The issue instance fields, in a legal context, may therefore contain the text of the cited rules as written in the documents. In another embodiment, the issue instance fields may contain an issue instance identifier that points to an entry in another metadata file that contains the actual text of the reason-for-citing or cited-text-area. As an example and not a limitation, a reason-for-citing metadata file may be used to store the text associated with reasons-for-citing within documents of the corpus. One embodiment of a reason-for-citing metadata file is described below with respect to FIG. 7.

The issue instance fields may also contain a link to the actual document that the issue instance is related to. The issue instance may be accessed by an end-user or a software program to retrieve the document that the particular issue instance is from. In one embodiment, the actual citation may be included in the issue instance field. In another embodiment, a document identifier may be provided that points to the location of the actual document for retrieval.

The issue library metadata entity may also contain additional information that is not depicted in Table 1. For example, the issue library metadata entity may contain information regarding a cited statute or statues that are related to the particular issue, as well as a cited article or articles, such as law review articles for example, that discuss the particular issue. Links to the most frequently cited documents for the particular issue may also be included in the library metadata file, as well as documents that are held in high regard by a community and, in the legal context, Shepard's treatment information regarding the particular issue.

Referring once again to FIG. 5, the various extracted issues may be organized under a taxonomy structure 110. FIG. 5 illustrates one example of a portion of such a taxonomy structure. The nodes 117 positioned under taxonomy sub-topic two 116 represent various issues extracted from the corpus. These issues are relevant to the particular taxonomy topic and sub-topics—that are depicted. Using the example from above, the issues represented by nodes 117 may be related to Contracts Law→Remedies→Rescission & Redhibition. Each node has a unique issue identifier associated therewith. It should be understood that the illustrated issue identifiers of FIG. 5 are for demonstrative purposes only. Referring to the example of Table 1 above, issue I-000001 is directed toward rescission and may therefore be placed under the taxonomy topic or sub-topic "Rescission & Redhibition."

A plurality of issue instances 118 are positioned under the nodes 117 representing the issue instances. Each box under an issue identifier may represent one or more issue instances, as illustrated in Table 1. For example, some issues may have thousands or tens of thousands of associated issue instances. Other issues may only have a few associated issue instances.

The generation of the citation-pairing metadata file referenced above as well as its operation will now be described hereinbelow. The citation-pairing metadata file assists in the creation of the issue library metadata entities described above.

Figure 6:
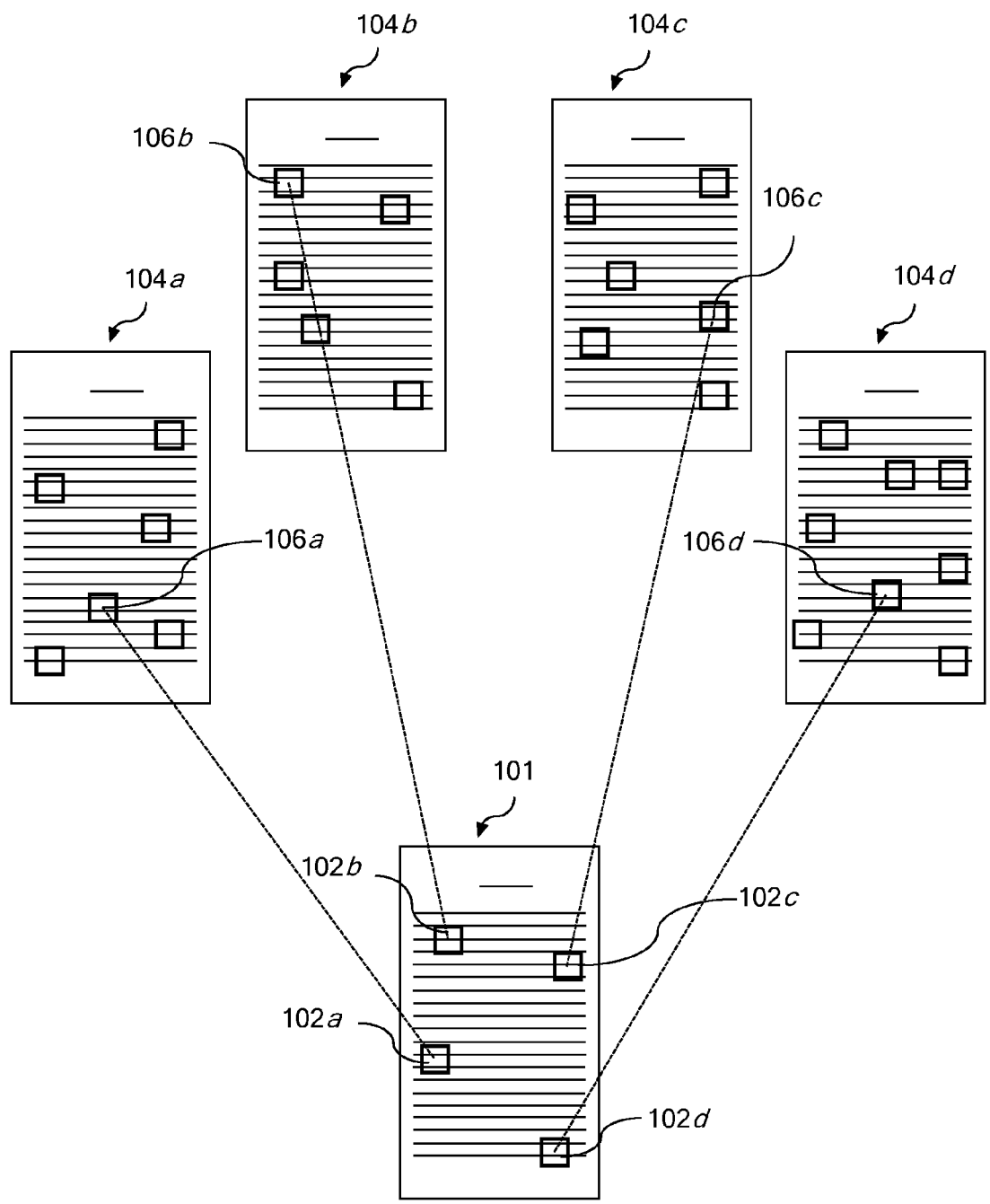
FIG. 6 depicts a schematic illustration of a relationship between a citing document and a plurality of cited documents according to one or more embodiments shown and described herein.

FIG. 6 illustrates a citing document 101 and a plurality of cited documents 104a-d. The illustrated citing document 101 has four citations and corresponding reasons-for-citing 102a-d. Each reason-for-citing 102a-d is located proximate to a citation within the cited document 101. The citations link the citing document 101 to the plurality of cited documents 104a-d. The drafter of the citing document 101 has a particular reason for citing each cited document 104. For example, the drafter of the citing document may wish to incorporate a particular rule from cited document 104a into the cited document. The cited-text-area 106a of cited document 104a may recite the particular rule that corresponds with the reason-for-citing 102a of the citing document 101. The reason-for-citing 102a and cited-text-area 106a may be semantically different. As illustrated, the citing document 101 and cited document 104a are linked at both a document level and a passage level. Similarly, reason-for-citing 102b is semantically linked to cited-text-area 106b of cited document 104b, reason-for-citing 102c is semantically linked to cited-text-area 106c of cited document 104c, and reason-for-citing 102d is semantically linked to cited-text-area 106d of cited document 104d.

However, the citations only identify the particular cited documents cited by a citing document, and not the particular text area or passage that is being cited. Current pairing techniques are asymmetric because a reason-for-citing is at the citing document end of the link, but at the other end it is the whole case: Case_X:Reason_For_Citing_a→Case_Y. Embodiments described herein enable cases to be linked at the passage level on both ends of the link and store citation entries within a citation-pairing metadata file that contains information regarding the semantically linked pairing.

The citation-pairing metadata file specifies the citation relationship between two cases at the semantic level (i.e., at the passage level). The citation-pairing metadata file contains a citation entry for each reason-for-citing of every document within the corpus (or a select group of documents within the corpus). Below is an example of a citation entry format of one embodiment:
CitingCaseID:Reason-For-CitingID::CitedCaseID:CitedTextAreaID::SimilarityValue The CitingCaseID and CitedCaseID fields of the above example are a citing document identifier and a cited document identifier, respectively. These identifiers contain information that point to particular documents within the corpus. Within each citing document are a plurality of reasons-for-citing or rules. For example and not limitation, the citing document may have 20 citations and therefore 20 corresponding reasons-for-citing. The Reason-For-CitingID field is a reason-for-citing identifier that points to the particular reason-for-citing within the citing document. For example, the reason-for-citing identifier may point to the fifth reason-for-citing in the citing document, which may be for a particular rule of law.

A plurality of reasons-for-citing or rules are also present within each cited document. If the document is a legal document and the cited document is cited for a legal issue, there is usually a text area in the document that discusses the legal issue, and in most cases, the cited-text-area is located near another citation referencing another document. Therefore, there is a high likelihood that the reason-for-citing in the citing document is referring to a cited-text-area that corresponds to a reason-for-citing in the cited document. The CitedTextAreaID field is a cited-text-area identifier and commonly points to a reason-for-citing in the cited document.

The value present in the SimilarityValue field represents the relative semantic similarity between the text associated with the Reason-For-CitingID and the text associated with the CitedTextAreaID. The SimilarityValue will be described in more detail below.

An example of a citation entry included in a citation-pairing metadata file is provided below. It should be understood that the format and content of the exemplary citation entry may vary and embodiments are not limited thereto.

A72D7FE70BE40038:R__1::A26169830BE40246:R__5::0.832590108

In the above example, "A72D7FE70BE40038" is the citing-document identifier and may point to the case Rolley, Inc. v. Merle Norman Cosmetics, Inc., 129 Cal. App. 2d 844, for example. R__1 is the reason-for-citing identifier and corresponds to the first reason-for-citing in the citing case. As described in more detail below, the Reason-For-CitingID may point to an entry in a separate reason-for-citing metadata file. In the above example, R__1 of citing document Rolley, Inc. may state that:

"Appellate courts cannot submit to piecemeal argument and will not consider on petition for rehearing questions not previously raised."

CitedCaseID A26169830BE40246 may point to the cited case Bradley v. Bradley, 94 Cal. App. 2d 310, for example. The CitedTextID of R__5 indicates that the cited-text-area of the cited case is the fifth reason-for-citing. R__5 may point to an entry in a reason-for-citing metadata file that the fifth reason-for-citing in Bradley states:

"The case having been tried on the theory that condonation was not an issue appellant under settled principles cannot now change his theory [***3] appeal to the disadvantage of respondent."

Therefore, the above exemplary citation entry states that "Rolley, Inc. v. Merle Norman Cosmetics, Inc." cited "Bradley v. Bradley" for the legal issue of the ability for a party to raise new issues on appeal with a similarity measure between the two reasons-for-citing of about 0.8.

Figure 7:
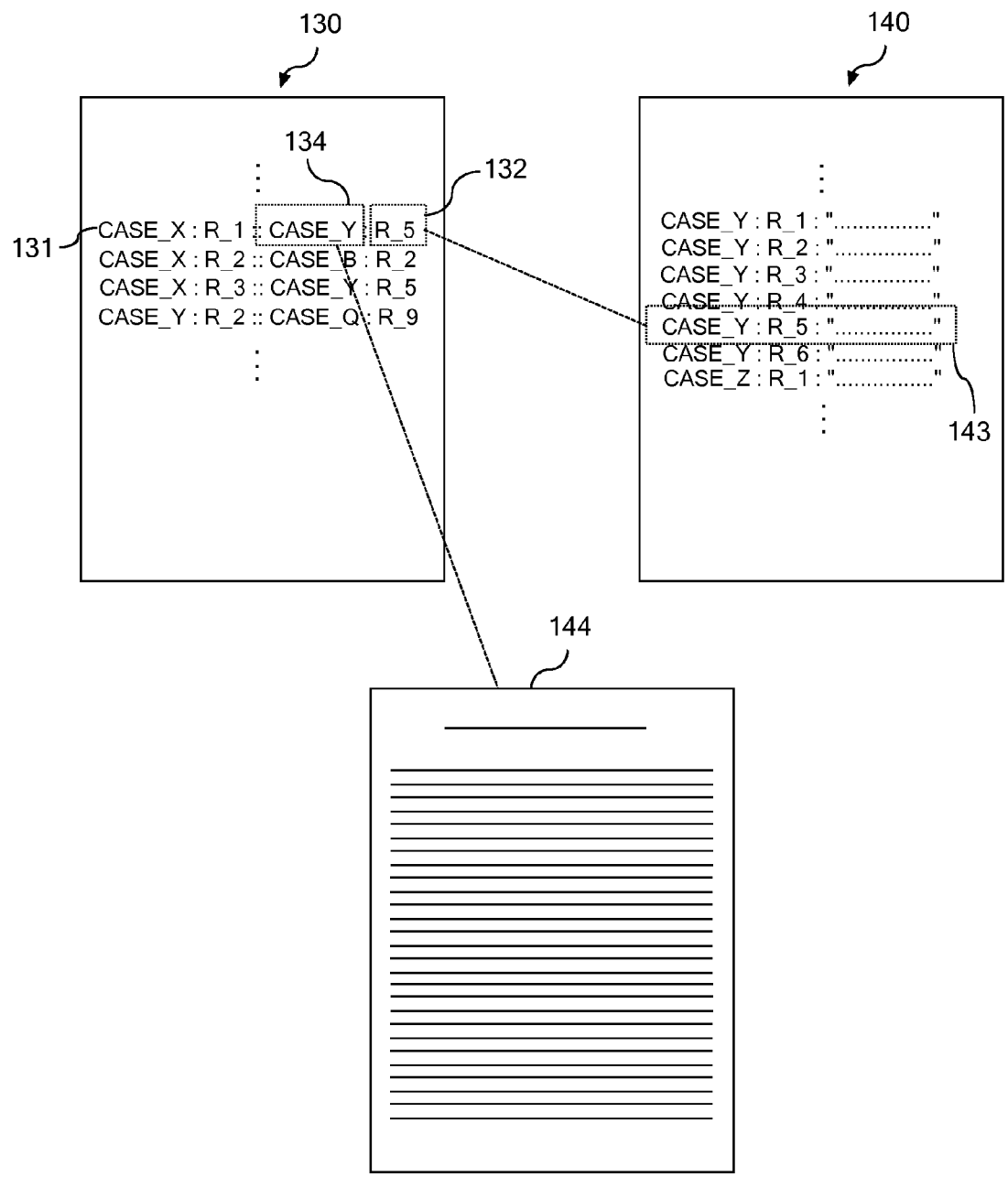
FIG. 7 depicts a schematic illustration of a document, a citation-pairing metadata file, a reason-for-citing metadata file, and relationships therebetween according to one or more embodiments shown and described herein.

Referring now to FIG. 7, a schematic illustration of a document 144, a citation-pairing metadata file 130 and a reason-for-citing metadata file 140 are illustrated. The document 144, citation-pairing metadata file 130 and reason-for-citing metadata file 140 are stored separately from one another. The citation-pairing metadata file 130 comprises a plurality of citation entries (e.g., citation entry 131). Depending on the size of the corpus, the citation-pairing metadata file 130 may have hundreds of thousands of citation entries. Each citation entry has semantic-pairing information associated therewith. The citation-pairing metadata file 130 may be accessed by a computer system to obtain information regarding passages relevant to particular issues or topics, or to find documents that discuss particular issues. As illustrated in FIG. 7, CASE_Y may contain linking information that, when accessed by an end-user and/or a computerized system, may retrieve the actual text of the document 144 corresponding to the CASE_Y CitedCaseID 134. For example, a user may initiate query using a software program configured to access the citation-pairing metadata file 130 to retrieve cases that cite a particular reason-for-citing.

The reason-for-citing metadata file 140 includes many reason-for-citing entries (e.g., reason-for-citing entry 143). The purpose of the reason-for-citing metadata file 140 is to provide the actual text string of reasons-for-citing associated with the documents in the corpus. As illustrated in FIG. 7, each reason-for-citing entry within the reason-for-citing metadata file 140 has information related to reasons-for-citing associated with each document in the corpus. In one embodiment, the reason-for-citing entry may have the following format:

CaseID:Reason-For-CitingID:Text_of_Reason-for-Citing

The CaseID may be the same document identifier described above, wherein the document identifier points to or is otherwise associated with a particular document in the corpus. The Reason-For-CitingID may be as described above and points to the particular reason-for-citing within the associated document. The Text_of_Reason-for-Citing contains the actual text string of the reason-for-citing (or cited-text-area) within the document. As shown in FIG. 7, each case may contain a plurality of reasons-for-citing/cited-text-areas. For example, "CASE_Y" has six reasons-for-citing. In one embodiment, all of the documents of the corpus are stored in a single reason-for-citing metadata file. Alternatively, more than one reason-for-citing metadata file may be used. In one embodiment, each document may have its own reason-for-citing metadata file.

The reason-for-citing metadata file 140 may be accessed via the citation-pairing metadata file 130 to obtain the text strings associated with reasons-for-citing and cited-text-areas within documents. In this manner, the citation-pairing metadata file 130 may be smaller in size because the text strings of each reason-for-citing/cited-text-area are not stored in the citation-pairing metadata file 130 but rather in the reason-for-citing metadata file.

Referring to FIG. 7 as an example, reason-for-citing/cited-text-area "R_5" of "CASE_Y" of the citation-pairing metadata file 130 (e.g., identifiers 134 and 132 of citation entry 131) may point to reason-for-citing entry 143 of the reason-for-citing metadata file 140. Reason-for-citing entry 143 is directed to the fifth reason-for-citing ("R_5") of the document CASE_Y. Reason-for-citing entry 143 also contains the text string of the reason-for-citing.

The citation-pairing metadata file and reason-for-citing metadata file enable the storage of voluminous amounts of data relating to documents, citations, related text passages and links in a relatively compact and easily-accessed format. The metadata is configured in such a way that allows for quick access and linking to support various software programs and applications, such as searching applications (e.g., more-like-this searching programs), issue libraries (i.e., groups of documents and/or issues/topics), and support of a citation network viewer in which the end-user may graphically view the citation network and sub-networks.

Software programs and applications may use the citation-pairing metadata file 130 and reason-for-citing metadata file 140 as described above to provide an end-user with the reasons-for-citing for the particular issues/topics he or she may be interested in. The end-user may perform a "more-like-this" search in which the software program accesses additional documents and reasons-for-citing related to the particular issue at hand.

Using the embodiments described herein, documents may be linked together beyond simple citation patterns alone or text matching alone. The metadata described herein can be used to link passages from different documents discussing the same topic/issue. It may give researches the ability to search document citations based on topics as well as citation. Embodiments may improve any search when an end-user is presented with a passage and hopes to find additional documents resembling the passage. Software programs using the embodiments described herein may proactively choose passages behind the scenes (using the citation-pairing metadata and reason-for-citing metadata) that are relevant to an end-user's search activities even when dissimilar language is used.

Figure 8:
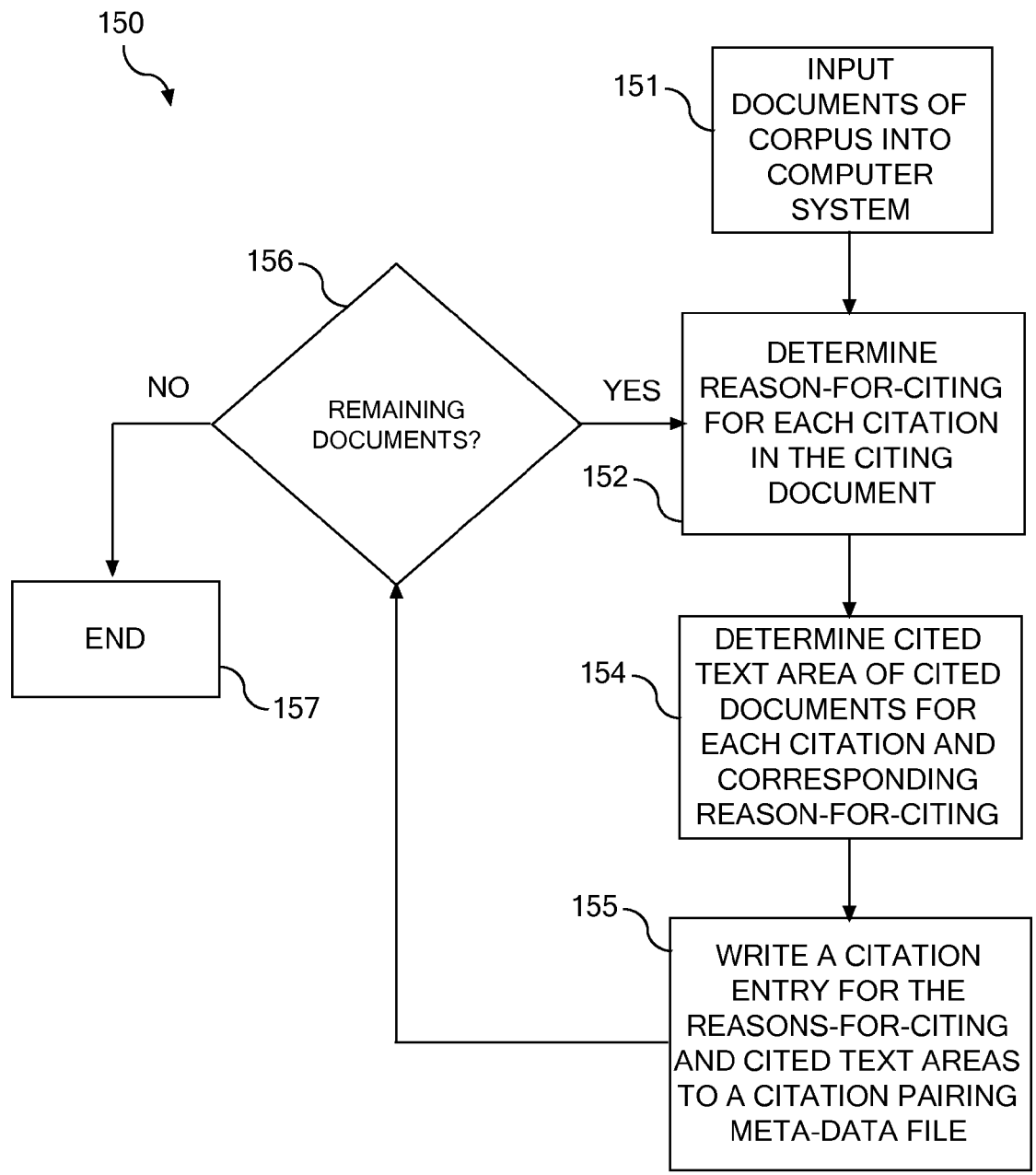
FIG. 8 depicts a flowchart illustration of a process for creating a citation-pairing metadata file according to one or more embodiments shown and described herein.
Figure 9:
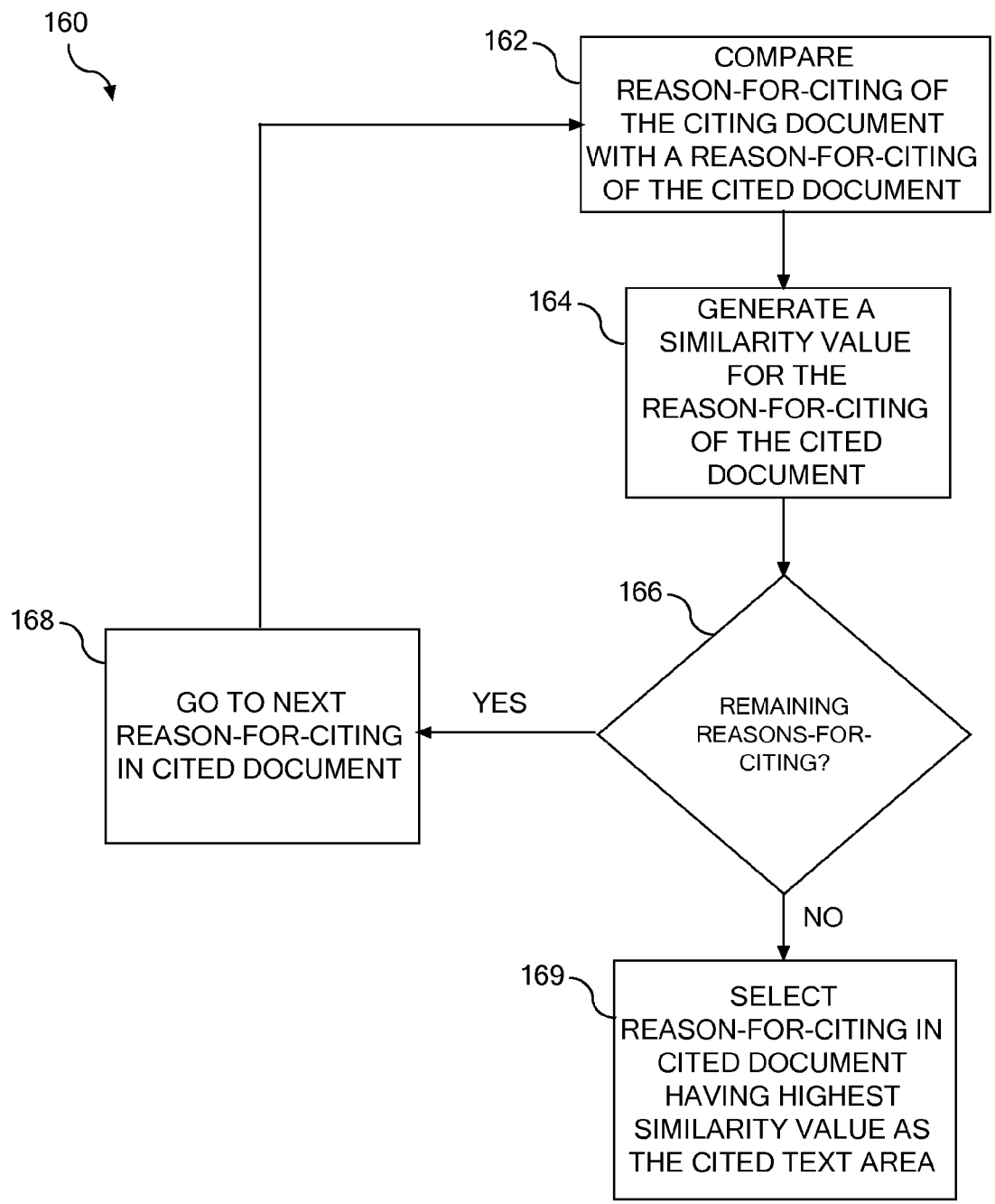
FIG. 9 depicts a flowchart illustration of a process for semantically pairing a reason-for-citing of a citing document with a cited-text-area of a cited document.

The creation of the pairing information and data that is populated into the citation-pairing metadata file will now be described. FIG. 8 illustrates a flowchart 150 that describes the process of creating the citation-pairing metadata file by populating the file with citation-pairing entries. The text of documents with a document corpus are input into a computer system at block 151. The computer system has computer code stored thereon that is operable to perform the various functions described herein. The corpus may be a legal corpus of a particular court or group of courts. For example, the legal corpus may be the all federal courts of appeals and the documents may be all judicial opinions (cases) associated with the federal courts of appeal. The corpus may also be a single court, such as the Court of Appeals for the Federal Circuit or the California Court of Appeal, for example. The legal corpus may also be an entire universe of legal opinions that span all state, federal and local courts.

At block 152, a reason-for-citing is determined for each citation within the document. The reasons-for-citing may be determined via the use of a reason-for-citing algorithm that is configured for identifying text in a citing court case near a citation (i.e., a citing instance), which indicates the reason(s) for citing. The reason-for-citing algorithm aids in the development of the citation-pairing metadata file by correctly locating reason-for-citing and cited-text-areas, as well as their respective boundaries within the document. One embodiment of a reason-for-citing algorithm is described in U.S. Pat. No. 6,856,988, which is incorporated herein by reference as though fully set forth in its entirety. Generally, the reason-for-citing algorithm includes the steps of: obtaining contexts of the citations (i.e., citing instances) in the citing document (each context including text that includes the citation and the text that is near the citation), analyzing the content of the contexts, and selecting (from the citing instances' context) text that constitutes the reason-for-citing, based on the analyzed content of the contexts. The boundaries of the determined reasons-for-citing may be marked within the text of the document. For example, the boundaries may be marked with XML tags that delineate the text of the reasons-for-citing from the remaining text of the document. Subsequent processes, such as the processes described below, may use the XML tags or other markers to determine the locations of the various reasons-for-citing.

At block 154, the text area of a cited document that the citing document is citing is located. This step finds the text area in the cited document that is most semantically-equivalent to the reason-for-citing in the citing document. One method of determining the cited-text-area that is most semantically-equivalent to a reason-for-citing is described in U.S. Pat. No. 7,735,010. Generally, referring to the flowchart 160 of FIG. 9, the reasons-for-citing are determined in the cited document with the reasons-for-citing algorithm described above. The reasons-for-citing within the citing and cited documents are turned into vectors (e.g., by the use of key term extraction, lexical normalization, weighing, etc.). The vectors of the citing document and cited documents are paired and semantically compared with one another at block 162. A similarity value is established for each reason-for-citing within the cited document(s) at block 164. A vector comparison function may be used to measure the similarity between the two vectors. If there are remaining reasons-for-citing in the cited document(s) at block 166, the next reason-for-citing in a cited document is selected at block 168 and the process is repeated at block 162. If there are no more remaining reasons-for-citing at block 166, the reason-for-citing of a particular cited document having the highest similarity value is selected as the cited-text-area at block 169.

Referring once again to FIG. 8, after the cited-text-areas of the cited documents are determined at block 154, a citation entry is written for each reason-for-citing of the citing document into the citation-pairing metadata file at block 155. As described above, a citation entry contains information related to the citing document, the reason-for-citing of the citing document, the cited document, the reason-for-citing (or cited-text-area) of the cited document, and the similarity value. At block 156 it is determined whether or not there are remaining documents in the corpus. If yes, the process is repeated at block 152. If no, the process ends at block 157. In this manner, citation entries regarding semantically-paired documents and passages for each document in the corpus may be recorded in the citation-pairing metadata file.

It should now be understood that the embodiments described herein are directed to methods for creating an issue library with a corpus of documents. Data-mining techniques may be used to extract a plurality of issues that are discussed within the documents of the corpus. Passages within the documents that are semantically similar may be grouped together as an issue. The individual issues may be stored in issue library metadata entities to establish the issue library. The issue library metadata entities may contain information regarding the documents within the particular group, the issue instances, index terms, issue text and other information that may be relevant to the issue. The issue library metadata entities may be used to support a wide variety of applications, such as searching documents within a corpus by issue, developing a taxonomy structure for the documents within the corpus, finding related documents, and many others.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer-implemented method of generating an issue library from a corpus of documents defining a citation network, the method comprising:
    semantically linking, by a computing device, electronic documents within the corpus of documents by pairing reasons-for-citing in citing documents with cited-text-areas in cited documents, wherein a cited-text-area in a cited document is a text area that has a highest similarity value of text present within the cited document;
    storing citation entries associated with the semantically-linked electronic documents in a citation-pairing metadata file;
    searching the citation entries of the citation-pairing metadata file for reasons-for-citing and cited-text-areas that are semantically similar to at least one issue to thereby group similar documents and reasons-for-citing by issue;
    creating a group of semantically-similar reasons-for-citing and cited-text-areas that are semantically similar to the at least one issue; and
    storing information regarding groups of semantically-similar reasons-for-citing and cited-text-areas in an issue library metadata entity, wherein each issue library metadata entity is associated with an individual-issue, and each issue library metadata entity comprises:
        an issue identifier corresponding to the at least one issue;
        at least one taxonomy topic under which the issue identifier is located; and
        a plurality of issue instances under the at least one taxonomy topic, wherein each issue instance comprises a reason-for-citing or a cited-text-area in a document, each reason-for-citing or cited-text-area being semantically similar to one another and associated with the issue identifier.

2. The computer-implemented method of claim 1, wherein semantically linking the electronic documents further comprises:
    locating at least one citation present in the citing document;
    determining a reason-for-citing for the at least one citation;
    determining the cited-text-area present in the cited document, wherein the cited-text-area corresponds with the reason-for-citing; and
    populating a citation entry of the citation-pairing metadata file.

3. The computer-implemented method of claim 1, wherein the citation entry comprises a citing document identifier, a reason-for-citing identifier, a cited document identifier, and a cited-text-area identifier.

4. The computer-implemented method of claim 1, wherein searching the citation-pairing metadata file further comprises:
    performing a depth-first search of the citation network by querying the citation-pairing metadata file; and
    retrieving forward-chained and backward-chained reasons-for-citing and cited-text-areas that are semantically similar to the at least one issue.

5. The computer-implemented method of claim 1, wherein the issues are determined by the groups established by searching the citation-pairing metadata file and are not predetermined.

6. The computer-implemented method of claim 1, wherein the issue library metadata entity further comprises
    issue text of the at least one issue, wherein the issue text is representative of the at least one issue and is presented to an end-user researching the at least one issue.

7. The computer-implemented method of claim 6, wherein:
    the issue text comprises a selected reason-for-citing or cited-text-area that is selected from the reasons-for-citing or cited-text-areas of the individual issue; and
    the selected reason-for-citing or cited-text-area is selected based at least in part on linguistic rules.

8. The computer-implemented method of claim 6, wherein the issue library metadata entity further comprises index terms associated with the individual issue, the index terms being extracted from the issue instances.

9. A system that includes a computer-based issue library comprising:

a memory component that stores at least the following:
  a plurality of electronic documents within a corpus, wherein the documents within the corpus are linked by citations;
  a citation-pairing metadata file comprising a plurality of citation entries, wherein each citation entry comprises a semantically linked reason-for-citing in a cited document with a cited-text-area in a cited document, and the cited-text-area in the cited document is a text area that has a highest similarity value of text present within the cited document; and
  a plurality of electronic issue library metadata entities stored separately from the plurality of documents in a database, each issue library metadata entity is directed to an individual issue of a plurality of issues resulting from searching the citation-pairing metadata file for reasons-for-citing and cited-text-areas that are semantically similar to the individual issue, wherein each issue library metadata entity comprises:
    an issue identifier corresponding to the individual issue;
    issue text of the individual issue, wherein the issue text is representative of the individual issue and is to be presented to an end-user researching the individual issue;
    at least one taxonomy topic under which the issue identifier is located; and
    a plurality of issue instances under the at least one taxonomy topic, wherein each issue instance comprises a reason-for-citing or a cited-text-area in a document retrieved from the citation-pairing metadata file, each reason-for-citing or cited-text-area being semantically similar to one another and associated with the issue identifier, wherein the individual issues of the issue library metadata entities are organized by a taxonomy structure.

10. The system of claim 9, wherein:
  the issue text comprises a selected reason-for-citing or cited-text-area that is selected from the reasons-for-citing or cited-text-areas of the individual issue; and
  the selected reason-for-citing or cited-text-area is selected based at least in part on linguistic rules.

11. The system of claim 9, wherein the issue library metadata entity further comprises index terms associated with the individual issue, the index terms being extracted from the issue instances.

12. The system of claim 9, wherein the issue library metadata entity further comprises a cited statute and/or a cited article.

13. The system of claim 9, wherein the individual issues are determined by searching the citation network for reasons-for-citing and cited-text-areas that are semantically similar and organizing the semantically similar reasons-for-citing and cited-text-areas into groups.

14. The system of claim 9, wherein each issue instance comprises an issue instance identifier that points to text associated with the corresponding reason-for-citing or cited-text-area that is stored in a metadata file that is separate from the issue library metadata entity.

15. A computer-implemented system for generating an issue library from a corpus of documents, wherein documents within the corpus of documents are linked by citations, thereby forming a citation network, the system comprising a processor and a non-transitory computer-readable medium storing a citation metadata file, one or more library metadata entities, and computer readable instructions that, when executed by the processor, cause the processor to:
  semantically link documents within the corpus of documents to pair reasons-for-citing in citing documents with cited-text-areas in cited documents and for storing citation entries associated with the semantically-linked documents in the citation-pairing metadata file, wherein a cited-text area in a cited document is a text area that has a highest similarity value of text present within the cited document;
  search the citation-pairing metadata file for reasons-for-citing and cited-text-areas that are semantically similar to at least one issue to thereby group similar documents and reasons-for-citing by issue;
  group semantically-similar reasons-for-citing and cited-text-areas that are semantically similar to the at least one issue; and
  store information regarding groups of semantically-similar reasons-for-citing and cited-text-areas in a plurality of issue library metadata entities, wherein each issue library metadata entity is associated with an individual issue, and each issue library metadata entity comprises:
    an issue identifier corresponding to the at least one issue;
    at least one taxonomy topic under which the issue identifier is located; and
    a plurality of issue instances under the at least one taxonomy topic, wherein each issue instance comprises a reason-for-citing or a cited-text-area in a document, each reason-for-citing or cited-text-area being semantically similar to one another and associated with the issue identifier.

16. The computer-implemented system of claim 15, wherein the the computer readable instructions cause the processor to semantically link documents by:
  locating at least one citation present in the citing document;
  determining a reason-for-citing for the at least one citation;
  determining the cited-text-area present in the cited document, wherein the cited-text-area corresponds with the reason-for-citing; and
  populating a citation entry of the citation-pairing metadata file.

17. The computer-implemented system of claim 16, wherein the citation entry comprises a citing document identifier, a reason-for-citing identifier, a cited document identifier, and a cited-text-area identifier.

18. The computer-implemented system of claim 15, wherein the computer readable instructions cause the processor to group semantically-similar reasons-for-citing and cited-text-areas that are semantically similar to the at least one issue by:
  performing a depth-first search in the citation network by querying the citation-pairing metadata file; and
  retrieving forward-chained and backward-chained reasons-for-citing and cited-text-areas that are semantically similar to the at least one issue.

19. The computer-implemented system of claim 15, wherein the issue library metadata entity further comprises issue text of the individual issue, wherein the issue text is representative of the individual issue and is to be presented to an end-user researching the individual issue.

20. The computer-implemented system of claim 19, wherein:
  the issue text comprises a selected reason-for-citing or cited-text-area that is selected from the reasons-for-citing or cited-text-areas of the individual issue; and
  the selected reason-for-citing or cited-text-area is selected based at least in part on linguistic rules.

* * * * *